United States Patent
Lee

(10) Patent No.: US 11,305,579 B2
(45) Date of Patent: Apr. 19, 2022

(54) BICYCLE AXLE

(71) Applicant: Chung-Che Lee, Taichung (TW)

(72) Inventor: Chung-Che Lee, Taichung (TW)

(*) Notice: Subject to any disclaimer, the term of this patent is extended or adjusted under 35 U.S.C. 154(b) by 185 days.

(21) Appl. No.: 16/728,576

(22) Filed: Dec. 27, 2019

(65) Prior Publication Data
US 2020/0290400 A1 Sep. 17, 2020

(30) Foreign Application Priority Data
Mar. 14, 2019 (TW) .................................. 108203104

(51) Int. Cl.
*B62K 25/02* (2006.01)
*B60B 35/04* (2006.01)
*B60B 27/02* (2006.01)

(52) U.S. Cl.
CPC ............ *B60B 35/04* (2013.01); *B60B 27/023* (2013.01)

(58) Field of Classification Search
CPC ........ B62K 25/02; B60B 27/023; B60B 35/04
See application file for complete search history.

(56) References Cited

U.S. PATENT DOCUMENTS

| | | | | |
|---|---|---|---|---|
| 4,072,081 A | * | 2/1978 | Curtis | F16B 31/028 411/10 |
| 4,477,121 A | * | 10/1984 | Atkins | B60B 27/02 301/112 |
| 4,906,053 A | * | 3/1990 | Kawai | B60B 27/023 301/110.5 |
| 5,121,973 A | * | 6/1992 | Phillips | B60B 27/023 301/110.5 |
| 5,447,362 A | * | 9/1995 | Nagano | B60B 27/023 301/110.5 |
| 6,241,322 B1 | * | 6/2001 | Phillips | B60B 27/0078 301/110.5 |

FOREIGN PATENT DOCUMENTS

| | | | | |
|---|---|---|---|---|
| DE | 102016111517 A1 | * | 12/2016 | ............ B62K 25/02 |
| TW | 201641322 A | * | 12/2016 | ............ B60B 30/10 |

* cited by examiner

*Primary Examiner* — Scott A Browne
(74) *Attorney, Agent, or Firm* — Muncy, Geissler, Olds & Lowe, PC

(57) ABSTRACT

A bicycle axle is provided, including a mandrel and a sleeve member. The mandrel defines an axial direction and includes an axial rod, a head portion radially protruding from an end of the axial rod and an engaging portion radially protruding from the axial rod and being axially spaced apart from the head portion. The sleeve member is sleeved around the head portion and includes a flange radially extending inwardly. At least part of the flange is located between the head portion and the engaging portion and is abuttable against the head portion and the engaging portion in the axial direction.

7 Claims, 6 Drawing Sheets

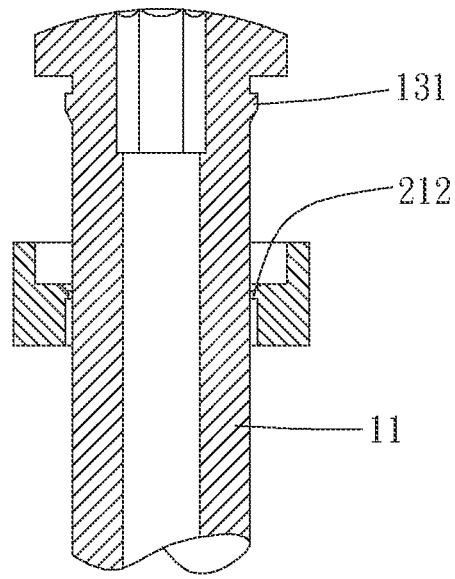
FIG. 6
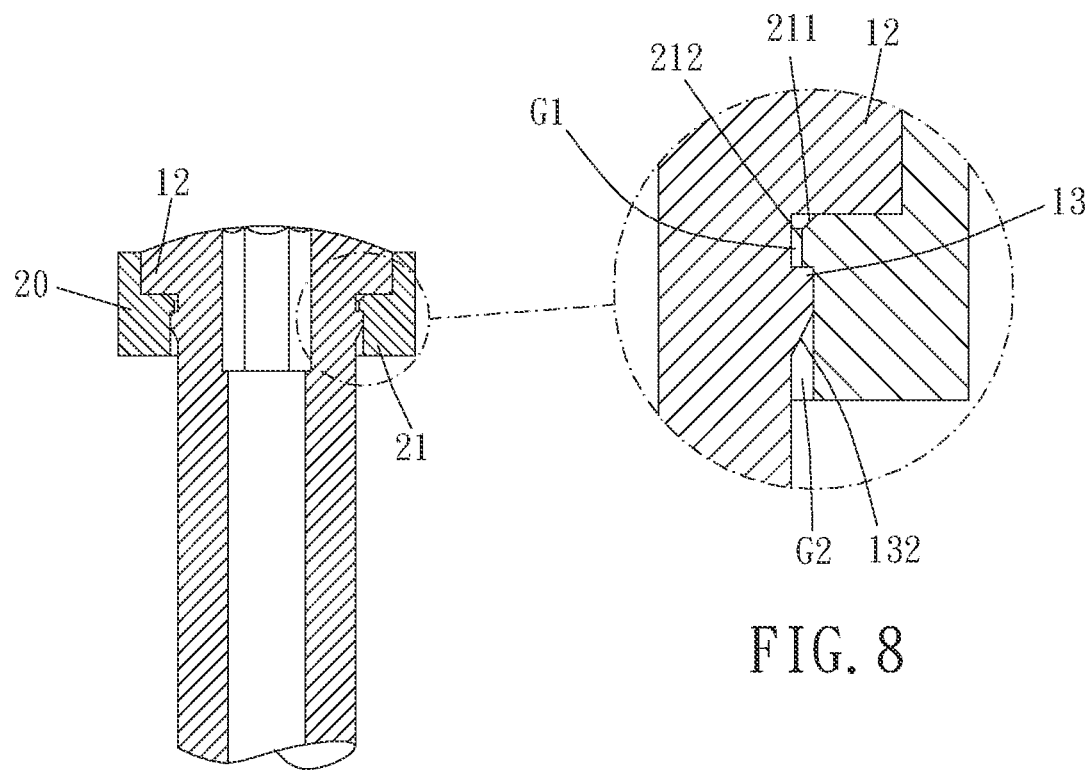
FIG. 7
FIG. 8

BICYCLE AXLE

BACKGROUND OF THE INVENTION

Field of the Invention

The present invention relates to a bicycle axle.

Description of the Prior Art

A conventional bicycle axle is configured to be disposed through a hub and fastened between front or rear dropouts. The conventional bicycle axle includes an axial member and a sleeve member. An end of the axial member has a head portion, another end of the axial member is configured for a nut to be screwed thereon, and the sleeve member is rotatably sleeved around the head portion. In operation, the axial member is driven to rotate by a driving tool so as to tighten the sleeve member and the nut on the front or rear dropouts.

Generally, an inner circumferential surface of the sleeve member and an outer circumferential surface of the head portion are processed to have corresponding engaging structures (such as thread, engaging projection or the like), and part of the sleeve member can pass through the outer circumferential surface of the head portion and axially interfere with the head portion so as to prevent the sleeve member from disengaging from the axial member. However, the conventional bicycle axle has a complicated structure and high cost for processing and assembling.

The present invention is, therefore, arisen to obviate or at least mitigate the above-mentioned disadvantages.

SUMMARY OF THE INVENTION

The main object of the present invention is to provide a bicycle axle which has a simple structure and is easy to be manufactured and assembled.

To achieve the above and other objects, the present invention provides a bicycle axle, including a mandrel and a sleeve member. The mandrel defines an axial direction and includes an axial rod, a head portion radially protruding from an end of the axial rod and an engaging portion radially protruding from the axial rod and being axially spaced apart from the head portion. The sleeve member is sleeved around the head portion and includes a flange radially extending inwardly. At least part of the flange is located between the head portion and the engaging portion and is abuttable against the head portion and the engaging portion in the axial direction.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIGS. 6 and 7 are schematic diagrams showing assembling of the first preferable embodiment of the present invention;

FIG. 8 is a partial enlargement of FIG. 7;

DETAILED DESCRIPTION OF THE PREFERRED EMBODIMENTS

Figure 1:
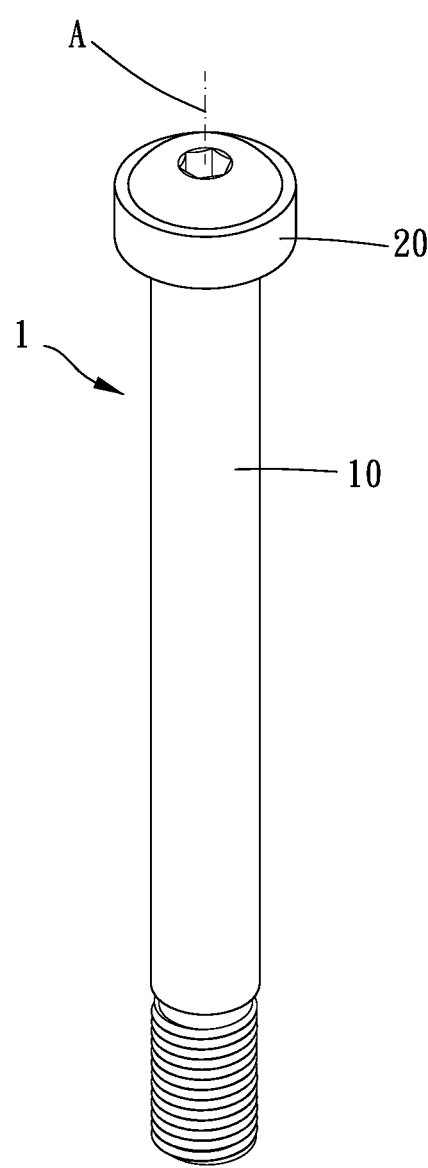
FIG. 1 is a stereogram of a first preferable embodiment of the present invention.
Figure 2:
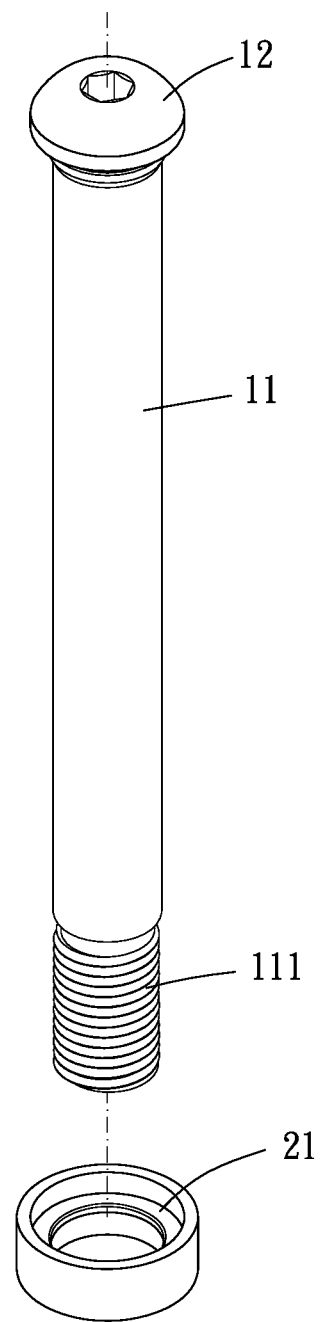
FIG. 2 is a breakdown drawing of the first preferable embodiment of the present invention.
Figure 3:
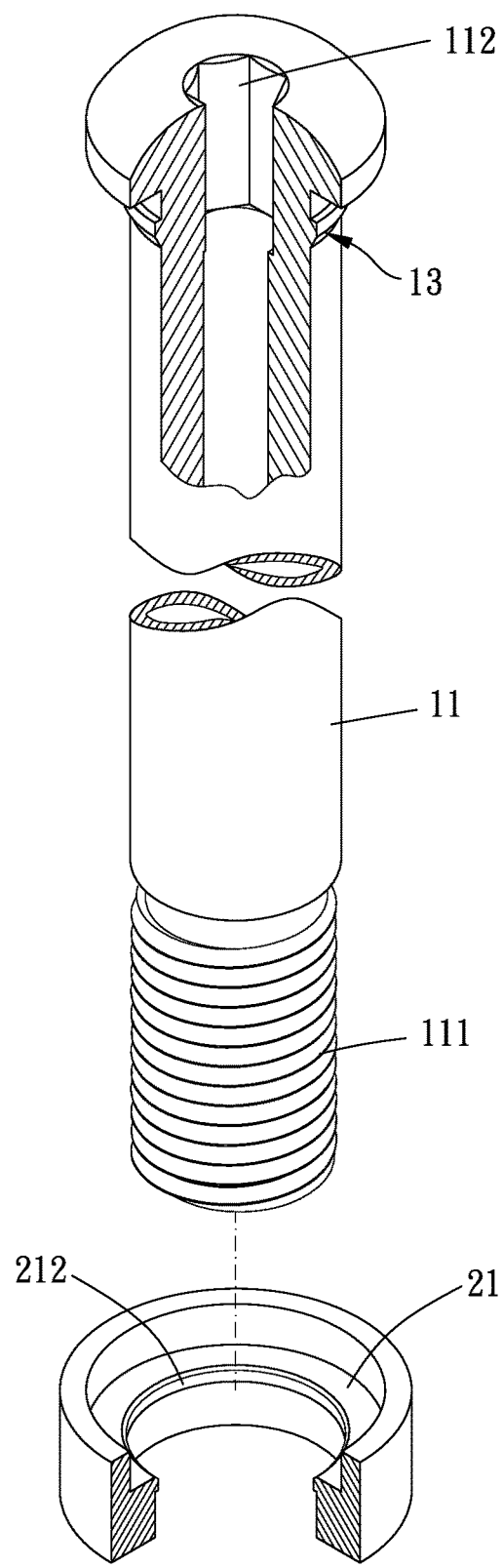
FIG. 3 is a partial cross-sectional enlargement of FIG. 2.
Figure 4:
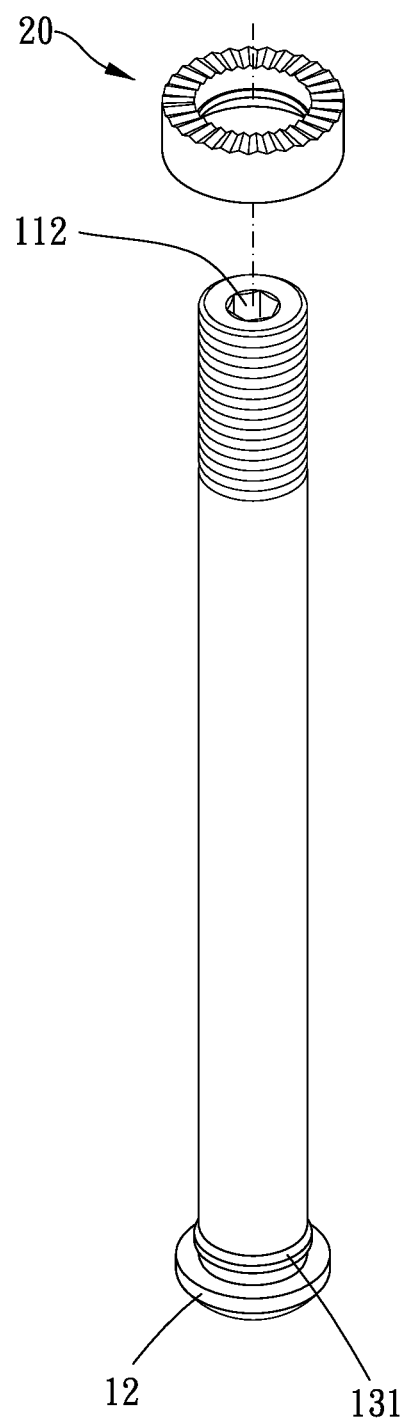
FIG. 4 is another breakdown drawing of the first preferable embodiment of the present invention.
Figure 5:
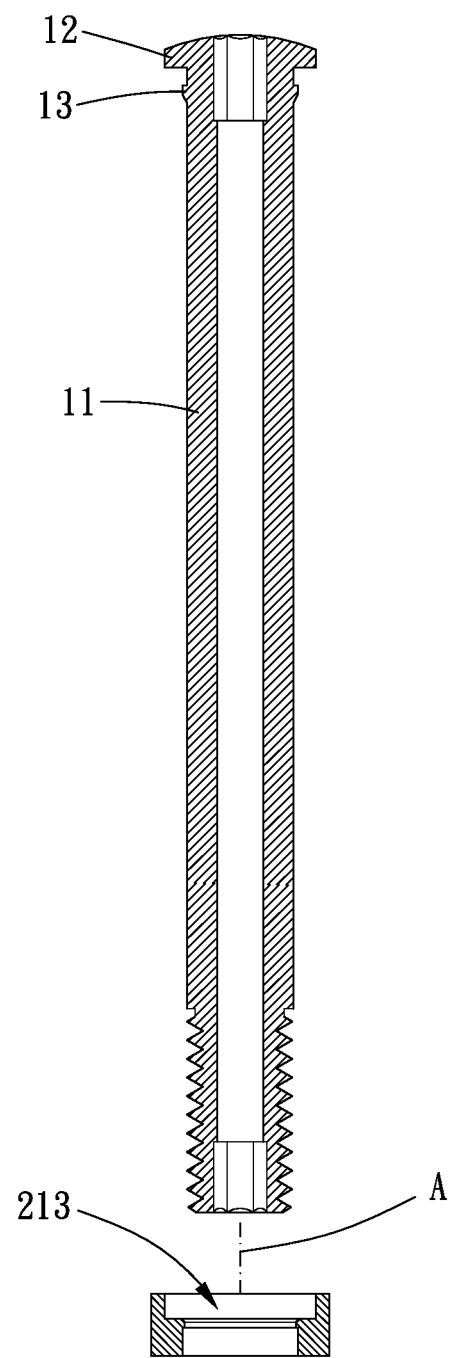
FIG. 5 is a cross-sectional view of the first preferable embodiment of the present invention.

Please refer to FIGS. 1 to 8 for a preferable embodiment of the present invention. A bicycle axle 1 of the present invention includes a mandrel 10 and a sleeve member 20.

The mandrel 10 defines an axial direction A and includes an axial rod 11, a head portion 12 radially protruding from an end of the axial rod 11 and an engaging portion 13 radially protruding from the axial rod 11 and being axially spaced apart from the head portion 12. The sleeve member 20 is sleeved around the head portion 12 and includes a flange 21 radially and integrally extending inwardly. At least part of the flange 21 is located between the head portion 12 and the engaging portion 13 and is abuttable against the head portion 12 and the engaging portion 13 in the axial direction A. The flange 21 and the head portion 12 may be at least partially overlapped with, interfere with or contact the engaging portion 13 in the axial direction A, or be circumferentially abutted against the engaging portion 13. Therefore, the sleeve member 20 can be assembled to the mandrel 10 and the bicycle axle 1 has a simple structure and is easy to be manufactured and assembled.

The engaging portion 13 includes at least one engaging projection 131, and the at least part of the flange 21 is interferable with the at least one engaging projection 131 in the axial direction A so that the flange 21 is abuttable against the at least one engaging projection 131 to prevent the sleeve member 20 from being disassembled from the axial rod 11. Each of the at least one engaging projection 131 includes an inclined guiding surface 132 located at a side remote from the head portion 12 so that the flange 21 can be smoothly passed through each of the at least one engaging projection 131 for easy assembling. In this embodiment, the at least one engaging projection 131 is an annular projection integrally disposed on the axial rod 11, and the annular projection has the inclined guiding surface 132, which is easy to assemble and stably restricts the sleeve member 20. However, the at least one engaging projection may include a plurality of blocks or ribs which are spacingly disposed around the axial rod.

Preferably, at least one of two axially opposite sides of an inner circumferential surface of the flange 21 has a guiding surface 211 tilted outwardly for easy assembling. In this embodiment, a side of the inner circumferential surface of the flange 21 adjacent to the head portion 12 has the guiding surface 211 tilted outwardly and annularly disposed thereon, which can guide the sleeve member 20 without alignment. In other embodiments, the two axially opposite sides of the inner circumferential surface of the flange may have respective guiding surfaces, which is convenient for assembling or disassembling the sleeve member; the flange may include a plurality of said guiding surfaces spacingly disposed therearound.

The axial rod 11 may be made of aluminum, and the engaging portion 13 preferably protrudes radially beyond an outer circumferential surface of the axial rod 11 by 0.2 mm to 0.5 mm. The engaging portion 13 is radially deformable so that the flange 21 is easy to pass through the engaging portion 13 without abrasion. Specifically, the inner circumferential surface of the flange 21 has a lip 212 radially and inwardly protruding integrally therefrom, and the lip 212 is located between the head portion 12 and the engaging portion 13 and is interferable with the head portion 12 and the engaging portion 13 in the axial direction A. Preferably, an inner circumferential surface of the lip 212 and the outer circumferential surface of the axial rod 11 define a first gap G1 therebetween, and the inner circumferential surface of the flange 21 and the outer circumferential surface of the axial rod 11 define a second gap G2 located at a side of the engaging portion 13 axially opposite to the first gap G1, as shown in FIGS. 7 and 8, which decreases friction of the sleeve member 20 and the axial rod 11 and allows the axial rod 11 to be smoothly rotatable relative to the sleeve member 20. The flange 21 defines a penetrating hole 213 through which the mandrel 10 penetrates. In the axial direction A, a distance between the head portion 12 and the engaging portion 13 is larger than (preferably) or equal to a thickness of the lip 212 so that the sleeve member 20 can smoothly rotate relative to the mandrel 10. Relative to an axle center of the axial rod 11, a minimum diametric dimension of the penetrating hole 213 is smaller than a maximum diametric dimension of the engaging portion 13 so that the lip 212 is stably restricted between the engaging portion 13 and the head portion 12. In other embodiments, the minimum diametric dimension of the penetrating hole may be equal to the maximum diametric dimension of the engaging portion, and when the lip radially corresponds to the engaging portion, the lip is circumferentially abutted against the engaging portion and passes through the engaging portion so that the lip is not easy to detach from the engaging portion, which is convenient for assembling and disassembling.

The head portion 12 and the axial rod 11 are integrally formed of one piece so as to have good structural strength. An end of the axial rod 11 opposite to the head portion 12 has a threaded segment 111 which is configured to be screwed with a nut. Each of two end surfaces of the axial rod 11 has an assembling hole 112, such as a hexagonal hole, which is configured to be assembled with a driving tool or wrench to rotate the mandrel 10.

Figure 9:
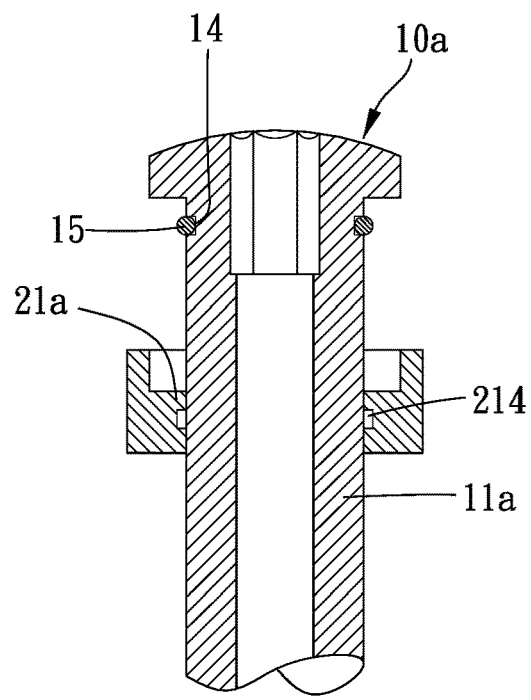
FIGS. 9 and 10 are schematic diagrams showing assembling of a second preferable embodiment of the present invention.
Figure 10:
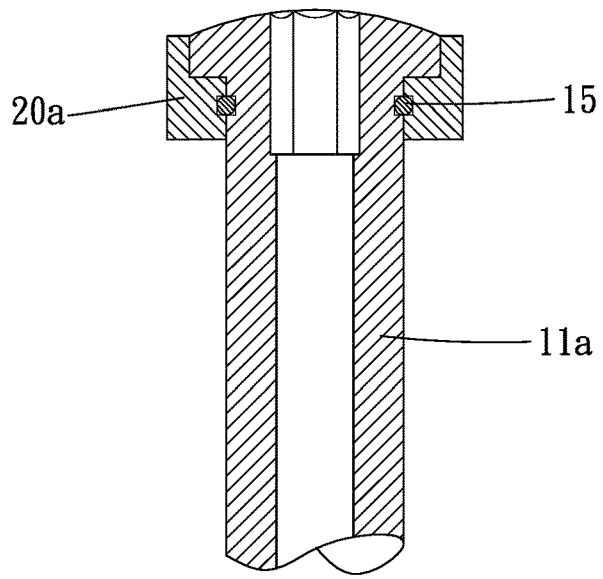

Please refer to FIGS. 9 and 10 for a second preferable embodiment of the present invention. The mandrel 10a further includes at least one groove 14 disposed on an outer circumferential surface of the axial rod 11a and at least one restricting member 15 received within the at least one groove 14, and the at least one restricting member 15 has the engaging portion and protrudes beyond the outer circumferential surface of the axial rod 11a so as to restrict the flange 21a. In this embodiment, the at least one groove 14 is an annular groove, and the at least one restricting member 15 is an O-ring. When the sleeve member 20a is assembled to the mandrel 10a, the O-ring is abutted against the flange 21a and is radially deformed so that at least part of the flange 21a can pass through the O-ring, and then the O-ring elastically recovers and is stably abutted against and restricts the flange 21a. The O-ring is elastically deformable and has good structural strength. The at least one groove may include a plurality of recessions, and the at least one restricting member may include a plurality of projections received within the plurality of recessions; the at least one restricting member may be a C-shaped retainer which is radially deformable for easy assembling; the at least one restricting member may have other configurations according to material characteristics and various requirements. Preferably, the inner circumferential surface of the flange 21a has at least one engaging concave 214 radially recessed thereon, and the engaging portion 13a is embedded within the at least one engaging concave 214 so that the sleeve member 20a is stably assembled to the mandrel 10a and is smoothly rotatable relative to the mandrel 10a. In this embodiment, the at least one engaging concave 214 is an annular recession which is convenient to assemble without alignment.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle axle, including:
    a mandrel, defining an axial direction, including an axial rod, a head portion radially protruding from an end of the axial rod and an engaging portion radially protruding from the axial rod and being axially spaced apart from the head portion;
    a sleeve member, being rotatably sleeved around the head portion, including a flange radially and integrally extending inwardly, at least part of the flange being located between the head portion and the engaging portion and being abuttable against the head portion and the engaging portion in the axial direction;
    wherein the engaging portion includes at least one engaging projection, the at least part of the flange is interferable with the at least one engaging projection in the axial direction;
    wherein each of the at least one engaging projection includes an inclined guiding surface located at a side remote from the head portion;
    wherein an inner circumferential surface of the flange has a lip radially and inwardly protruding integrally therefrom, the lip is located between the head portion and the engaging portion and is interferable with the head portion and the engaging portion in the axial direction;
    wherein an inner circumferential surface of the lip and an outer circumferential surface of the axial rod define a first gap therebetween, and the inner circumferential surface of the flange and the outer circumferential surface of the axial rod define a second gap located at a side of the engaging portion axially opposite to the first gap.

2. The bicycle axle of claim 1, wherein the engaging portion protrudes radially beyond the outer circumferential surface of the axial rod by 0.2 mm to 0.5 mm.

3. The bicycle axle of claim 1, wherein the flange defines a penetrating hole through which the mandrel penetrates, in the axial direction, a distance between the head portion and the engaging portion is larger than or equal to a thickness of the lip, and relative to an axle center of the axial rod, a minimum diametric dimension of the penetrating hole is smaller than a maximum diametric dimension of the engaging portion.

4. The bicycle axle of claim 1, wherein at least one of two axially opposite sides of the inner circumferential surface of the flange has a guiding surface tilted outwardly.

5. The bicycle axle of claim 1, wherein the mandrel further includes at least one groove disposed on the outer circumferential surface of the axial rod and at least one restricting member received within the at least one groove, and the at least one restricting member has the engaging portion.

6. The bicycle axle of claim 1, wherein the inner circumferential surface of the flange has at least one engaging concave radially recessed thereon, and the engaging portion is embedded within the at least one engaging concave.

7. The bicycle axle of claim 3, wherein the at least one engaging projection is an annular projection disposed on the axial rod; the annular projection includes an inclined guiding surface located at a side remote from the head portion; the engaging portion protrudes radially beyond the outer circumferential surface of the axial rod by 0.2 mm to 0.5 mm; a side of the inner circumferential surface of the flange adjacent to the head portion has a guiding surface tilted outwardly and annularly disposed thereon; an end of the axial rod opposite to the head portion has a threaded segment; each of two end surfaces of the axial rod has an assembling hole.

* * * * *